April 6, 1965 F. L. GREEN 3,177,364
SHUTTER CONTROLLED RADIOGRAPHIC EXPOSURE UNIT
Filed Aug. 22, 1962 2 Sheets-Sheet 1
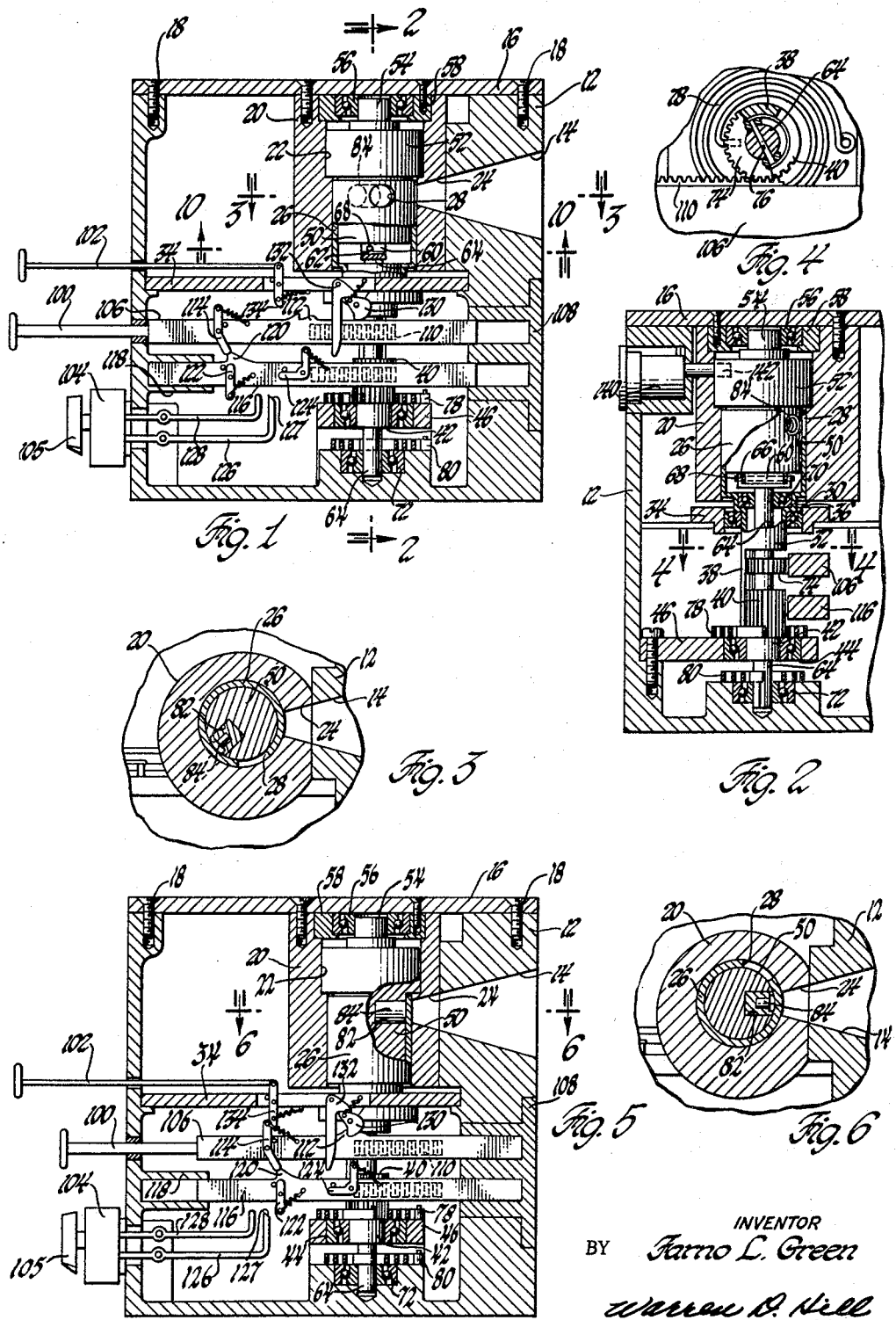
INVENTOR
Farno L. Green
BY
Warren D. Hill
ATTORNEY April 6, 1965

F. L. GREEN 3,177,364

SHUTTER CONTROLLED RADIOGRAPHIC EXPOSURE UNIT

Filed Aug. 22, 1962

INVENTOR
BY *Farno L. Green*

*Warren D. Hill*
ATTORNEY

United States Patent Office 3,177,364
Patented Apr. 6, 1965

3,177,364
SHUTTER CONTROLLED RADIOGRAPHIC
EXPOSURE UNIT
Farno L. Green, Bloomfield Hills, Mich., assignor to General Motors Corporation, Detroit, Mich., a corporation of Delaware
Filed Aug. 22, 1962, Ser. No. 218,705
7 Claims. (Cl. 250—105)

This invention relates to radiographic exposure devices and more particularly to an improved shutter mechanism therefor.

Recent developments in low radiation energy radioisotope source materials have made it possible to use such sources in both medical and industrial radiography. It is well known to use high energy radioisotope sources such as cobalt 60 for industrial radiography. Such high energy sources have been limited to applications permitting use of bulky shielding, and hence, have been limited to more or less stationary installations. The advent of the low energy sources has led to forseeable uses of portable radiographic units whereby doctors in remote areas or field hospitals and veterinarians on farms could readily take X-rays of their patients since neither complex electrical power supplies nor bulky X-ray equipment would be required. Similarly, in industry, radiography could be made available where either space or cost considerations made conventional X-ray or high energy radioisotope radiography impractical.

Various types of shutter mechanisms for such exposure units utilizing low energy sources have been proposed but these, for the most part, have been limited to uses where long exposure times are required or where accurate exposure times are not essential. Recent developments in radioisotope sources, however, have made it possible to use exposure times of the order of a few seconds or less for diagnostic radiography. Hence it is essential that an exposure unit be provided which makes possible short and accurate exposure times. One of the most difficult problems encountered in achieving such an exposure unit is that for safety reasons, the radioactive source must be shielded by a large dense mass of material while the unit is in storage and prior to the exposure while the patient or other subject is being prepared for radiography. However, prior to the time of the present invention there has been no simple way of removing the shield, exposing the source and replacing the shield, and at the same time providing an accurate control of the exposure time. Accordingly, it is an object of the present invention to provide an exposure unit overcoming the above disadvantages.

Further objects of the invention are to provide a unit which provides safe storage for the radioactive source and which would retain its shielding integrity in the event of fire or other accident and which prevents accidental operation or operation by unauthorized personnel.

The invention is carried out by providing a hollow mass of shielding material having an exposure aperture therein, a rotary source carrying member within the shield for aligning the source with the exposure aperture, and a rotary shutter member having a further exposure aperture which may be aligned with the first aperture.

The invention also contemplates that control mechanism be provided to actuate the source carrying member and shutter member according to a predetermined schedule.

The above and other advantages will be made more apparent from the following specification taken in conjunction with the accompanying drawings wherein like reference numerals refer to like parts and wherein:

FIGURE 1 is a partly broken away cross sectional view of an exposure unit according to the invention shown in source stored position;

FIGURE 2 is a partly broken away cross sectional view of the exposure unit taken along lines 2—2 of FIGURE 1;

FIGURE 3 is a cross sectional view of part of the exposure unit taken along lines 3—3 of FIGURE 1;

FIGURE 4 is a cross sectional view of the exposure unit taken along lines 4—4 of FIGURE 2;

FIGURE 5 is a view of the exposure unit of FIGURE 1 shown in shutter cocked position;

FIGURE 6 is a cross sectional view taken along lines 6—6 of FIGURE 5;

Figure 7:
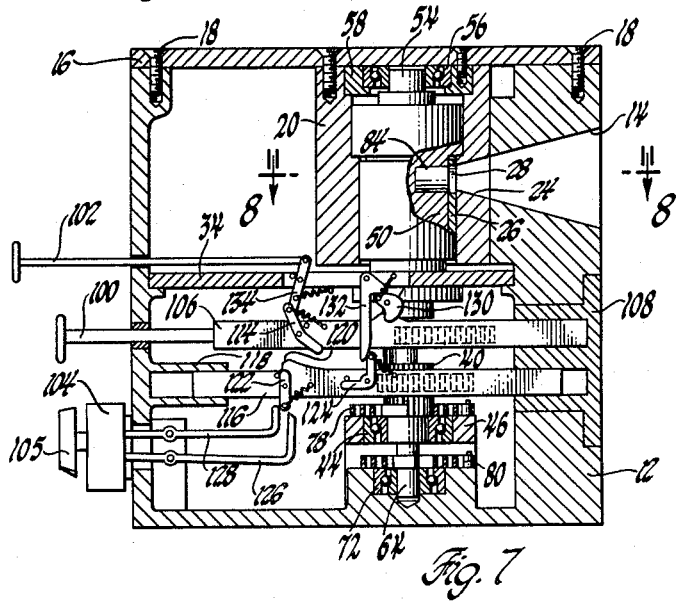
FIGURE 7 is a cross sectional view of the exposure unit of FIGURE 1 shown in source exposed position.

Referring now to FIGURES 1 and 2, the exposure unit comprises a housing 12, preferably of aluminum casting, forming a five-sided box and having a conical aperture 14 in one side thereof. An end plate 16 is secured to the open side of the housing 12 by a plurality of screws 18. A stationary generally cylindrical sheld member 20 is secured within the housing 12 and has a cylindrical bore 22 formed stepwise in three different diameters and further contains a conical aperture 24 in one side thereof in registry with the conical aperture 14 of the housing 12.

A thin walled annular shutter 26 is rotatably mounted within the bore 22 and the shutter also has an aperture 28 which may be aligned with the conical aperture 24 when the shutter 26 is moved to the proper angular position. The shutter 26 is designed to have a low moment of inertia so that it may be moved rapidly. The shutter has at one end a reduced portion 30 providing a shoulder and a further reduced portion 32 extending from the shoulder. A panel 34 extending across the housing 12 carries a ball bearing assembly 36 which rotatably supports the further reduced portion 32 of the shutter 26. An integral web 38 connects the reduced portion 32 with a hollow pinion 40 spaced from but coaxial with the reduced portion 32. Finally, the pinion 40 terminates in a short hollow shaft 42 which is carried by a ball bearing assembly 44 mounted on a support 46 secured to the housing 12.

A massive cylindrical rotor 50 is rotatably mounted within the shutter 26 and has a shoulder portion 52 of enlarged diameter seated within an enlarged portion of the bore 22. One end of the rotor 50 terminates in a shaft 54 which is held by a bearing assembly 56, which in turn is secured to the end plate 16 by an outer bearing housing 58. The other end of the rotor 50 terminates in a stub portion 60 having a transverse slot 62 formed therein offset from the rotor axis. The stub portion 60 is supported by a rotor shaft 64 having a yoke 66 carrying a pin 68 which engages the slot 62. The rotor shaft 64 is carried by a bearing assembly 70 which in turn is seated within the reduced portion 30 of the shutter 26. The shaft 64 extends through the hollow pinion 40 and shaft 42 to the bottom of the housing 12 wherein it is journaled by means of another bearing assembly 72. In the space between the reduced portion 32 and pinion 40 of the shutter 26, the rotor shaft 64 carries a sector pinion 74 secured to the shaft 64 by pin 76, as shown in FIGURE 4. When viewed from the top of the drawings as in FIGURE 3, the shutter 26 is biased in a clockwise direction by a spiral spring 78 connected between the support 46 and the pinion 40 and the rotor 50 is similarly biased by a second spiral spring 80 connected between the housing and a slot in shaft 64.

The rotor 50 contains in one side thereof a cavity 82 which contains a radioisotope photon source 84. The source 84 is axially located in the same plane with the exposure aperture 28 of the shutter 26. When the rotor is in source stored position as shown in FIGURES 1, 2 and 3, the source is shielded on all sides by at least two of the elements comprising the rotor 50, the shutter 26 and the stationary shield 20. Preferably, each of these three elements is made of a very dense shielding material such as a tungsten alloy. It is obvious that the shield 20 and rotor 50 must be quite massive to furnish the major portion of the shielding, but the relatively thin shutter 26 will also provide a very substantial shielding effect. It should be noted that the shield 20, although it is generally cylindrical in shape, is not concentric with its inner bore but rather is offset downwardly so that when the source 84 is in stored position a larger amount of shielding material is disposed directly in front of the source than if the shield 20 were concentric with the bore. Less shielding material is required near the top of the shield 20 because the mass of the rotor 50 contributes to the shielding in that direction. Thus the mass of shield 20 is concentrated where it is most needed and yet the shield has a simple configuration and is easy to fabricate.

By way of summary, the essential elements of the exposure unit thus far described include a housing 12, a stationary shield 20 within the housing, a shutter 26 rotatably mounted within the shield 20, a rotor 50 rotatably mounted within the shutter 26, a source 84 recessed in one wall of the rotor 50, and apertures in the elements which may all be brought into alignment with the source 84 upon suitable manipulation of the rotor 50 and shutter 26.

Figure 8:
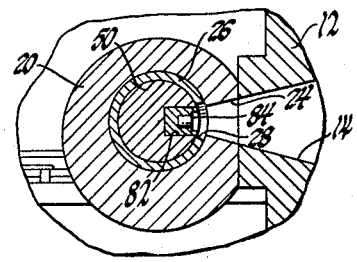
FIGURE 8 is a cross sectional view taken along lines 8—8 of FIGURE 7.

The remainder of the mechanism to be described is a shutter control mechanism represented more or less schematically. The purpose of the control mechanism will be to normally maintain the source and shutter in stored position as shown in FIGURES 1, 2 and 3, to effect movement of the source and shutter to cocked position as shown in FIGURES 5 and 6, to effect movement of the shutter to open position as shown in FIGURES 7 and 8, and to cause the movement of first the shutter and then the rotor back to stored position.

The operation of the shutter control mechanism is effected by three external manual controls—a cocking plunger 100, a release plunger 102, and a timer 104. The cocking plunger 100 passes through the housing 12 and is secured to a rotor rack 106 which slides in an insert 108 in one wall of housing 12. The rack includes a series of teeth 110 which engage the sector pinion 74 on the rotor shaft 64. The rack 106 further includes on the upper side thereof an abutment portion 112, and a ratchet lever 114 pivoted on the front face thereof. The ratchet lever 114 is spring biased in a clockwise direction but is limited in movement by a pin extending from the face of the rack 106. A shutter rack 116 adjacent to and parallel with the rotor rack 106 is similarly guided in the insert 108 at one end and in a sleeve 118 secured to the housing at the other end. The shutter rack 116 has a series of teeth engaging the pinion 40 which is secured to the shutter 26. An abutment member 120 is formed on the top face of the rack 116 and, when the mechanism is in stored position as in FIGURE 1, the abutment member 120 engages the end of ratchet lever 114 on the rotor rack 106. The shutter rack 116 carries a ratchet lever 122 pivoted on the front face thereof and spring biased in the counterclockwise direction against a stop pin. A second ratchet lever 124 on the shutter rack 116 is spaced to the right of ratchet lever 122 and is spring biased in the clockwise direction against a stop pin.

The timer 104 is the type which has a movable pointer 105 for manually selecting the desired time. It has two levers pivoted to the wall of the housing and extending therethrough. The first lever 126, when pushed downwardly in a clockwise direction, is effective to start the operation of the timer 104. At the termination of the preset time interval the timer will cause the second lever 128 to pivot slightly in a clockwise direction to move the inner end thereof downwardly. The ends of the levers 126 and 128 are bent upwardly into an L-shape and normally lie in interference with the path of the ratchet lever 122 when the shutter rack 116 is moved. However, the ratchet action of lever 122 permits it to pass the levers 126 and 128 when moved to the right, but when the shutter rack is moved in the opposite direction then the levers 126 and 128 interfere with the movement of the rack 116. The inner end of lever 126 terminates in a cam surface 127 sloping downwardly to the right.

The panel 34 carries a latch member 130 pivoted thereon and spring biased in the clockwise direction. The lower portion of the latch member 130 is formed to engage and hold the abutment 112 on the rack 106 when the rack 106 is moved to the extreme right. A trip lever 132, also pivoted on the support member 34, has a finger engaging the top of the latch member 130 and a long arm extending downwardly in interference with the path of ratchet lever 124 so that when the arm is moved to the left the trip lever 132 rotates clockwise, and its finger engaging the latch lever cams the latch lever 130 counterclockwise to move it from latching position thereby releasing abutment 112.

The release plunger 102 extends through the housing 12 and is pivoted to one end of a release lever 134 pivoted on support 34 and spring biased in the counterclockwise direction. The free end of release lever 134 extends toward the rotor rack 106 and is locked so that when the rack 106 is moved to its extreme right position the free end of lever 134 lies adjacent the upwardly extending end of ratchet lever 114.

In operation of the radiographic exposure unit, it is necessary first to set the timer 104 for the desired exposure time and then to push the cocking plunger 100 to the extreme right. When the plunger thus moves, the ratchet lever 114 engages the abutment 120 of the shutter rack 106 and carries the rack 106 to its extreme righthand position. During this movement toward the right, ratchet lever 122 ratchets past levers 126 and 128 while ratchet lever 124 ratchets past the downwardly extending arm of trip lever 122. Then the control mechanism is in the position shown in FIGURE 5 wherein the latch member 130 is in engagement with abutment 112 and release lever 134 is adjacent the ratchet lever 114. Since the racks 106 and 116 are in engagement with sector pinion 74 and 40, the shutter and rotor also move angularly to wind up the spiral springs 78 and 80. The travel of the racks 106 and 116 is so selected that when they are in the cocked position of FIGURE 5, then the source 84 is opposite the aperture 24 of the shield 20 as shown in FIGURE 6. The aperture 28 of the shutter 26, however, is not in line with the aperture 24 since the aperture 28 was out of line with the source 84 when in stored position, and the rotor and shutter were moved through the same annular displacement. Hence, in cocked position the source is shielded by shutter 26 although the shielding effect is not as great as when the source is in the stored position of FIGURE 3. To expose the source it is necessary merely to depress the release plunger 102 to pivot the release lever 134 clockwise against the upper portion of ratchet lever 114, causing the lower portion of the ratchet lever to move out of engagement with abutment 120. This permits the spiral spring 78 to rotate the shutter in a clockwise direction in its exposed position as shown in FIGURE 8, and to similarly move the shutter rack 116 to the left. During its movement, however, ratchet lever 122 moves past the end of the first timer lever 126 engaging the cam surface 127, camming it downwardly and causing the timer 104 to start its operation. Immediately after camming down the lever 126, the ratchet lever 122 abuts lever 128 causing the rack 102 to stop in that position to thereby hold the shutter 26 in exposed or open position. When the preset time has expired the timer 104 will rotate lever 128 clockwise to release the shutter rack 116 whereupon the shutter, having a low moment of inertia, will be immediately moved to stored position by the force of spring 78. At this point it will be recognized that it is desirable for the rack 106 to be made as light as possible so as not to add appreciably to the inertia retarding the closing of the shutter 26.

Figure 9:
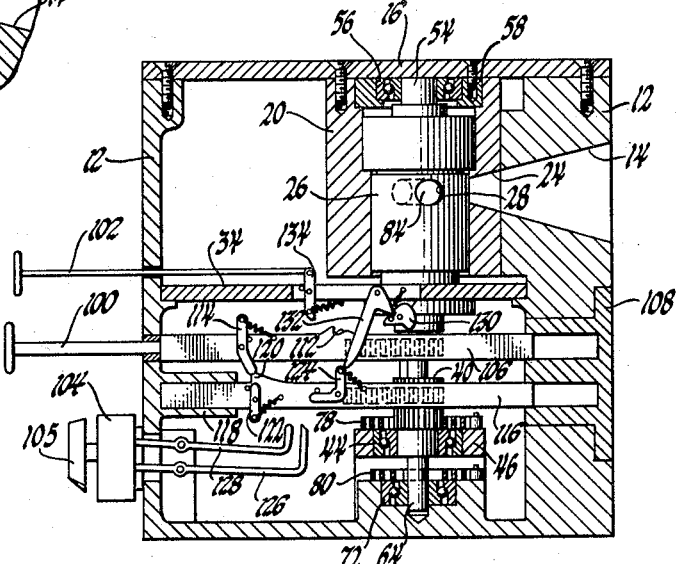
FIGURE 9 is a cross sectional view of the exposure unit of FIGURE 1 shown in shutter released position.
Figure 10:
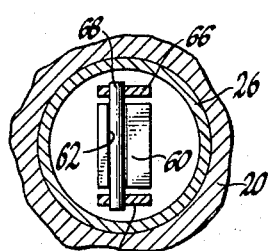
FIGURE 10 is a cross sectional view taken along lines 10—10 of FIGURE 1.

As illustrated in FIGURE 9, after the lever 128 has moved clockwise to release the shutter rack 116 and the rack begins to move to the left, the ratchet lever 124 momentarily moves the trip lever 132 in the clockwise direction to disengage the latch member 130 from the abutment 112 thereby permitting the rotor rack 106 and the rotor 50 to start their return to stored position under the action of the spiral spring 80. However, the rotor, having a very high moment of inertia, will not move as rapidly as the shutter 26 so that it will reach its stored position at some time after the shutter reaches its stored position.

Included among other operational features of the radiographic exposure unit is a key-operated lock 140 (FIGURE 2) mounted in the housing 112 and having a plunger 142 extending into a cavity in the side of the shoulder 52 of the rotor. When the lock 140 is operated with a key, the plunger 142 is withdrawn from the cavity permitting the free operation of the exposure unit. However, when the unit is locked the rotor is locked in stored position and, moreover, even if the end plate 16 were removed from the exposure unit, the plunger 142 would prevent removal of the rotor. On the other hand, when the lock plunger 142 is retracted and the end plate 16 with its associated bearing assembly 56 is removed, then it is a simple matter to safely remove the rotor 50 from the exposure unit by merely securing a long handle to the shaft 54 and pulling out the rotor. This procedure is used whenever a new source is to be installed within the rotor and enables the operation to be performed without danger of irradiation of the technicians changing the source where standard precautionary measures are taken. When the source and rotor are returned to the exposure unit it is impossible to position the source at the wrong angle since the pin and slot connection 62 and 68 is off-center and will accept the rotor only in the correct angular position.

Suitable low energy gamma ray sources include the rare earth metals. For example, samarium-153, thulium-170, lutetium-177, ytterbium-169, or gadolinium-153 may be used in the form of the metal, the enriched metal, or the rare earth oxide powder mixed with aluminum and sintered to form a cermet. The cermet type of sources and the method of fabricating the same are more fully described in the patent application of Black et al., S.N. 19,009, filed March 31, 1960, and assigned to the assignee of the present invention. These sources may be encased in an aluminum or stainless steel source container.

Ytterbium-169, in particular, has been found to be very useful with this type of exposure unit. The emission spectrum from ytterbium-169 consists principally of gamma photons of four significant energies of approximately 52 kev., 115 kev., 190 kev., and 310 kev. In terms of relative number of photons emitted at each energy level, more than half of the photons are in the 52 kev. portion of the spectrum with lesser amounts in the higher energy levels. Using a source of this type, it has been found that adequate shielding is provided in the source stored position when the source is surrounded on all sides by at least one-half inch of shielding material. Such a shielding arrangement meets the requirements of established safety regulations for storage and transportation of radioactive material. When the source is in cocked position as in FIGURE 6 and the source is shielded only by the shutter 26 and the shutter comprises an alloy containing 90% tungsten, 6% nickel and 4% copper, and the shutter wall is 1/8 inch thick, then substantially all of the 52 kev. photons are effectively shielded. Moreover, this relatively thin shield is effective to remove about 97% of the total number of photons from the beam emitted toward the exposure aperture. It is then not deleterious to the subject or to the resulting radiogram to have the exposure unit in the cocked position for a few seconds prior to opening the shutter.

In practice, exposure units fabricated according to the invention have been found to be highly portable, weighing less than 25 pounds, and have exhibited very consistent and accurate exposure times of the order of a few seconds or less and have produced excellent diagnostic radiograms.

The embodiments of the invention described herein are for the purposes of illustration and the scope of the invention is intended to be limited only by the following claims.

I claim:

1. A radiographic exposure unit comprising a housing, a cylindrical rotor of shielding material journalled in the housing, a radiation source mounted on the rotor, an annular shutter member of shielding material surrounding the rotor and journalled in the housing for rotation about the axis of rotation of the rotor, a stationary shield member surrounding the shutter and secured to the housing, apertures in the shutter and the shield member located in a plane passing through the radiation source and normal to the axis of rotation, and control means including means to rotate the rotor to place the radiation source in registry with the aperture in the shield member and means to rotate the shutter member to place its aperture in registry with the radiation source for a predetermined time whereby the radiation source is exposed during that time.

2. A radiographic exposure unit comprising a housing, a cylindrical rotor of shielding material journalled in the housing, a radiation source mounted on the rotor, an annular shutter member of shielding material surrounding the rotor and journalled in the housing for rotation about the axis of rotation of the rotor, a stationary shield member surrounding the shutter and secured to the housing, and apertures in the shutter and the shield member located in a plane passing through the radiation source and normal to the axis of rotation whereby upon suitable rotation of rotor and shutter member the source and apertures may be aligned to effect exposure of the source.

3. A radiographic exposure unit comprising a housing, a shield secured to the housing and having an exposure aperture therein, a shutter rotatably mounted in the housing and having an exposure aperture therein, a rotor rotatably mounted in the housing, a radiation source mounted on the rotor whereby the source and the apertures may be aligned to effect exposure of the source, spring means for biasing the rotor in one direction to source shielded position, spring means for biasing the shutter in the same direction, means for moving the shutter and rotor together in the other direction to align the source with the aperture in the shield, means for moving the shutter to align the aperture thereof with the aperture in the shield, and means for permitting return of the shutter and rotor to shielded position.

4. A radiographic exposure unit comprising a housing, a shield secured to the housing and having an exposure aperture therein, an annular shutter rotatably mounted in the housing and having an exposure aperture therein, a cylindrical rotor rotatably mounted in the housing within the shutter, and a radiation source mounted on the rotor whereby the source and the apertures may be aligned to effect exposure of the source.

5. A radiographic exposure unit comprising a housing, a shield secured to the housing and having an exposure aperture therein, a shutter rotatably mounted in the housing and having an exposure aperture therein, a rotor rotatably mounted in the housing and a radiation source mounted on the rotor whereby the source and the apertures may be aligned to effect exposure of the source.

6. A storage and exposure device for a radioisotope source comprising at least three bodies of shielding material, mounting means for permitting rotation of each of the bodies with respect to another of the remaining bodies, a radioisotope source mounted on one of the bodies, apertures in the other bodies, one of the three bodies having a low moment of inertia to allow rapid rotation thereof, and means to effect relative rotation of the bodies to alternately align and misalign the source and the apertures.

7. A storage and exposure device for a radioisotope source comprising at least three bodies of shielding material, mounting means for permitting rotation of each of the bodies with respect to another of the remaining bodies, a radioisotope source mounted on one of the bodies, apertures in the other bodies, and means to effect relative rotation of the bodies to alternately align and misalign the source and the apertures.

References Cited by the Examiner
UNITED STATES PATENTS

| | | | |
|---|---|---|---|
| 2,477,648 | 8/49 | Piggot | 250—108 |
| 2,889,464 | 6/59 | Ruehle | 250—106 |
| 2,891,168 | 6/59 | Goertz | 250—106 |

RALPH G. NILSON, *Primary Examiner.*